US008905154B2

(12) United States Patent
Uemura

(10) Patent No.: US 8,905,154 B2

(45) Date of Patent: Dec. 9, 2014

(54) IMPACT TORQUE ADJUSTING DEVICE OF HYDRAULIC TORQUE WRENCH

(75) Inventor: Yoji Uemura, Osaka (JP)

(73) Assignee: Uryu Seisaku Ltd., Osaka (JP)

( * ) Notice: Subject to any disclaimer, the term of this patent is extended or adjusted under 35 U.S.C. 154(b) by 528 days.

(21) Appl. No.: 13/042,624

(22) Filed: Mar. 8, 2011

(65) Prior Publication Data

US 2012/0055690 A1 Mar. 8, 2012

(30) Foreign Application Priority Data

Sep. 7, 2010 (JP) ................................ 2010-199790

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***B25B 21/02*** | (2006.01) |
| ***B25B 23/145*** | (2006.01) |

(52) U.S. Cl.

CPC ............. *B25B 21/02* (2013.01); *B25B 23/1453* (2013.01)

USPC .......................................................... 173/200

(58) Field of Classification Search

CPC ............................ B23B 21/02; B23B 23/1453

USPC ............... 173/90–212, 218–222; 137/625.65; 464/25

See application file for complete search history.

(56) References Cited

U.S. PATENT DOCUMENTS

| | | | |
|---|---|---|---|
| 3,214,940 A * | 11/1965 | Kramer | 464/25 |
| 3,283,537 A * | 11/1966 | Gillis | 464/25 |
| 3,814,133 A * | 6/1974 | Veh | 137/625.65 |
| 4,418,764 A * | 12/1983 | Mizobe | 173/177 |
| 4,553,948 A * | 11/1985 | Tatsuno | 464/25 |
| 4,635,731 A * | 1/1987 | Wallace et al. | 173/177 |
| 4,785,693 A * | 11/1988 | Minamiyama et al. | 81/465 |
| 4,838,133 A * | 6/1989 | Dainin | 81/465 |
| 5,080,181 A * | 1/1992 | Tatsuno | 173/93.5 |

(Continued)

FOREIGN PATENT DOCUMENTS

| | | | |
|---|---|---|---|
| EP | 2036679 A2 * | 3/2009 | B25B 23/145 |
| JP | 3-40076 | 4/1991 | |
| JP | 6-297349 | 10/1994 | |
| JP | 2009-83090 | 4/2009 | |

*Primary Examiner* — Robert Long

(74) *Attorney, Agent, or Firm* — Wenderoth, Lind & Ponack, L.L.P.

(57) ABSTRACT

An impact torque adjusting device of a hydraulic torque wrench enhances the precision of the magnitude of the impact torque generated, shortens the generation period of impact torques, and enhances the durability when rotating in either of two directions, that is, in normal rotation (when tightening) and in reverse rotation (when loosening). A working fluid path 11*b* communicates with the inside of a liner 7 serving as a high-pressure chamber H and a low-pressure chamber L when an impact torque is formed. A valve body 11*d* biased in a direction of releasing the working fluid path 11*b* is disposed in the working fluid chamber 11*b*. At the rear back side of the valve body 11*d*, an oil chamber 15*e* is formed to communicate with a blade insertion part 8*a* of a main shaft 8 by way of fluid paths 7*c*, 7*d* formed in liner lids 7*a*, 7*b*. The working fluid path 11*b* is thereby narrowed depending on an elevation of the pressure of the working fluid in the blade insertion part 8*a* of the main shaft 8 elevating along with an elevation of the working fluid in the high-pressure chamber H.

4 Claims, 8 Drawing Sheets

(56) References Cited

U.S. PATENT DOCUMENTS

| | | | | |
|---|---|---|---|---|
| 5,741,186 | A * | 4/1998 | Tatsuno | 464/25 |
| 6,334,494 | B1 * | 1/2002 | Nagato | 173/93.5 |
| 6,374,856 | B1 * | 4/2002 | Nitsche | 137/625.65 |
| 6,599,197 | B2 * | 7/2003 | Tatsuno | 464/25 |
| 7,032,685 | B2 * | 4/2006 | Nakamizo | 173/93.5 |
| 7,703,546 | B2 * | 4/2010 | Kettner | 173/93 |
| 8,430,185 | B2 * | 4/2013 | Uemura | 173/178 |
| 2004/0045729 | A1 * | 3/2004 | Lehnert et al. | 173/1 |
| 2004/0079425 | A1 * | 4/2004 | Rub | 137/625.65 |
| 2009/0065229 | A1 * | 3/2009 | Uemura | 173/93.5 |
| 2011/0203822 | A1 * | 8/2011 | Harada et al. | 173/20 |
| 2013/0081839 | A1 * | 4/2013 | Tully | 173/177 |

* cited by examiner

IMPACT TORQUE ADJUSTING DEVICE OF HYDRAULIC TORQUE WRENCH

TECHNICAL FIELD

The present invention relates to an impact torque adjusting device of a hydraulic torque wrench.

BACKGROUND ART

Conventionally, as an impact torque generating device of a torque wrench, a hydraulic torque wrench utilizing a hydraulic impact torque generating device small in noise and vibration has been developed and put in use (see, for example, patent literature 1 and 2).

FIG. 7 and FIG. 8 show an example of this hydraulic torque wrench, in which a hydraulic torque wrench 1 includes a main valve 2 for supplying and stopping high-pressure air, and a normal and reverse rotation changeover valve 3 for selectively generating impact torques in normal and reverse rotations. A rotor 4 for generating a rotational torque is driven by the air-pressure air sent through the both valves 2, 3. A hydraulic impact torque generating device 5 for converting the rotational torque of the rotor 4 to an impact torque is provided in a case 6 of the hydraulic torque wrench 1.

In the hydraulic impact torque generating device 5, a hollow space formed in a liner 7 rotated by the rotor 4 is filled and sealed with a working fluid, two blade insertion grooves (or one or three or more) are provided in a main shaft 8 inserted coaxially in the liner 7, blades 9 are inserted in the blade insertion grooves, and the blades 9 are always biased in the outer circumferential direction of the main shaft 8 so as to contact with the inner circumference of the liner 7 by spring 10.

The impact torque generating device 5 is also provided with an output adjusting mechanism 11 for adjusting the magnitude of the generated impact torque.

By rotating and driving the liner 7 by the rotor 4, when a plurality of seal surfaces formed on the inner circumference of the liner 7, seal surfaces formed on the outer circumference of the main shaft 8, and the blades 9 are matched, an impact torque is generated in the main shaft 8, and then nuts and other parts engaged with the leading end of the main shaft 8 are tightened or loosened.

In the conventional hydraulic torque wrench, the output adjusting mechanism 11 for adjusting the magnitude of the impact torque is designed to adjust the size of the working fluid path communicating with the inside of the liner 7 composed of a high-pressure chamber and a low-pressure chamber at the time of generation of the impact torque by manipulating an operation shaft. More specifically, when the operation shaft is manipulated to a releasing side to increase the working fluid path, the impact torque decreases, and to the contrary when the operation shaft is manipulated to a closing side to decrease the working fluid path, the impact torque increases.

However, the size of the working fluid path adjusted by manipulation of the operation shaft had the following problems (1) to (4) because it is the same (fixed) during operation of the hydraulic torque wrench.

(1) There is a large difference between the magnitude of the impact torque actually generated and the preset impact torque.

(2) An abnormally high impact torque is likely to be generated upon start of a tightening operation (at the time of seating of a tightening member).

(3) The resistance is large after generation of impact torque (after pulse generation), and the generation period of impact torques is long.

(4) A loading torque is likely to be applied to the seal part, and the durability is poor.

To solve these problems, the present applicant previously proposed an impact torque adjusting device of a hydraulic torque wrench capable of enhancing the precision of the magnitude of the impact torque generated by the impact torque generating device of the hydraulic torque wrench, shortening the generation period of impact toques, and enhancing the durability of the impact torque generating device of the hydraulic torque wrench (see, for example, patent literature 3).

FIG. 2 and FIG. 3 show a first reference example of an impact torque generating device of a hydraulic torque wrench.

A hydraulic torque wrench 1 of this reference example has a magnetorestrictive torque detection mechanism 12 same as the conventional hydraulic torque wrench disclosed in patent literature 2, and by the output of this magnetorestrictive torque detection mechanism 12, driving of a rotor 4 and others is controlled. It further includes a main valve 2 for supplying and stopping high-pressure air, and a normal and reverse rotation changeover valve 3 for selectively generating impact torques in normal and reverse rotations. The rotor 4 for generating a rotational torque is driven by the air-pressure air sent through both valves 2, 3, and a hydraulic impact torque generating device 5 for converting the rotational torque of the rotor 4 to an impact torque is provided in a case 6 of the hydraulic torque wrench 1.

In the hydraulic impact torque generating device 5, a hollow space formed in a liner 7 rotated by the rotor 4 is filled and sealed with a working fluid, two blade insertion grooves (or one or three or more) are provided in a main shaft 8 inserted coaxially in the liner 7, blades 9 are inserted in the blade insertion grooves, and the blades 9 are always biased in the outer circumferential direction of the main shaft 8 so as to contact with the inner circumference of the liner 7 by spring 10.

The impact torque generating device 5 is also provided with an output adjusting mechanism 11 for adjusting the magnitude of the generated impact torque.

By rotating and driving the liner 7 by the rotor 4, when a plurality of seal surfaces formed on the inner circumference of the liner 7, seal surfaces formed on the outer circumference of three main shaft 8, and the blades 9 are matched, an impact torque is generated in the main shaft 8, and nuts and other parts engaged with the leading end of the main shaft 8 are tightened or loosened.

In the hydraulic torque wrench of this reference example, the output adjusting mechanism 11, by manipulating an operation shaft 11*a*, is designed to adjust the size of a working fluid path 11*b* communicating with the inside of the liner 7 composed of a high-pressure chamber H and a low-pressure chamber L at the time of generation of a impact torque (more specifically, when the operation shaft 11*a* is manipulated to a releasing side to increase the working fluid path 11*b* (not to narrow), the impact torque decreases, and to the contrary when the operation shaft 11*a* is manipulated to a closing side to decrease the working fluid path 11*b* (to narrow), the impact torque increases).

Further, this output adjusting mechanism 11 is provided with a valve body 11*d* disposed in the working fluid path 11*b* so as to be formed in a direction of releasing the working fluid path 11*b* by way of the operation shaft 11*a* and a spring 11*c*, and the rear back side of this valve body 11*d* is provided with an oil chamber 11*e* communicating with the inside of the liner 7 which is the high-pressure chamber H at the time of generation of an impact torque. When the pressure of the working fluid in the high-pressure chamber H elevates along with the progress of the tightening operation, the working fluid path 11*b* is decreased (narrowed) as shown in FIG. 3 (*a*) to FIG. 3 (*b*), along with elevation of pressure of the working fluid in this high-pressure chamber H.

As a result, it is capable of enhancing the precision of the magnitude of the impact torque generated by the impact torque generating device of the hydraulic torque wrench, shortening the generation period of impact toques, and enhancing the durability of the impact torque generating device of the hydraulic torque wrench.

The above action and effects are explained as follows by referring to the output characteristic diagrams in FIG. 4. FIG. 4 (*a*) shows prior art where the size of the working fluid path is constant (fixed while the hydraulic torque wrench is working, and FIG. 4 (*b*) showing the present reference example, respectively.

(1) Since it is possible to control accurately the pressure of the working fluid inside of the liner 7, becoming the high-pressure chamber H depending on the tightening state, it is possible to enhance the precision of the magnitude of the impact torque because the error between the magnitude of the impact torque actually generated and the preset impact torque is in a relation of prior art: Δt1>reference example: Δt2.

(2) Upon start of a tightening operation (at the time of seating of a tightening member), since the working fluid path 11*b* is wide (not narrowed), unlike the prior art, an abnormally high impact torque tx is not generated.

(3) After generation of impact torque (after pulse generation), since the working fluid path 11*b* is wide (not narrowed), the resistance is small after generation of impact torque (after pulse generation), and the generation period of impact pulses is in a relation of prior art: T1>reference example: T2, and the working time required for tightening can be shortened.

(4) Since it is possible to control accurately the pressure of the working fluid inside the liner 7, becoming the high-pressure chamber H depending on the tightening state, loading pressure is hardly applied to the seal part such as in the prior art, and it is possible to enhance the durability of the impact torque generating device 5.

FIG. 5 shows a second reference example of an impact torque adjusting device of a hydraulic torque wrench.

A hydraulic torque wrench 1 of this reference example, unlike the first reference example having the magnetorestrictive torque detection mechanism 12 or the like for controlling the rotor 4 and others by the output of the torque detection mechanism, is similar to the conventional hydraulic torque wrench disclosed in patent literature 1 and FIG. 8, in which a relief valve B is disposed in an output adjusting mechanism 11. When the pressure (impact torque) of the working fluid in the high-pressure chamber H reaches a predetermined magnitude as the tightening operation is advanced, the relief valve B is released, and the pressure of the working fluid is transmitted to a shut-off valve mechanism 13.

In the case of the hydraulic torque wrench 1 of this type, since the valve body 11*d* cannot be assembled in the output adjusting mechanism 11, a valve body 14*d* is assembled in the liner 7, aside from the output adjusting mechanism 11.

The valve body 14*d* is biased in a direction of releasing the working fluid path 14*b* by way of a spring 14*c*, and the rear back side of this valve body 14*d* is provided with an oil chamber 14*e* communicating with the inside of the liner 7, which is the high-pressure chamber H at the time of generation of an impact torque. When the pressure of the working fluid in the high-pressure chamber H elevates along with the progress of the tightening operation, the working fluid path 14*b* is decreased (narrowed) along with elevation of pressure of the working fluid in this high-pressure chamber H.

The action of the impact torque adjusting device of the hydraulic torque wrench of this reference example is the same as that of the impact torque adjusting device of the hydraulic torque wrench of the first reference example.

FIG. 6 shows a third reference example of an impact torque adjusting device of a hydraulic torque wrench.

A hydraulic torque wrench 1 of this reference example is similar to the second reference example, in which a relief valve is disposed in an output adjusting mechanism 11 (detail shown in FIG. 5). When the pressure (impact torque) of the working fluid in the high-pressure chamber H reaches a predetermined magnitude as the tightening operation is advanced, the relief valve is released, and the pressure of the working fluid is transmitted to a shut-off valve mechanism 13 (see FIG. 8).

In the case of the hydraulic torque wrench 1 of this type, since the valve body 11*d* cannot be assembled in the output adjusting mechanism 11, a valve body 15*d* is assembled in the liner 7, aside from the output adjusting mechanism 11.

The valve body is composed of two valve bodies 15*d* disposed oppositely to each other across the working fluid path 15*b*, and is biased in a direction of releasing the working fluid path 15*b* by way of the spring 15*c*.

The rear back side of each valve body 15*d* is provided with an oil chamber 15*e* communicating with the inside of the liner 7, which is the high-pressure chamber H at the time of generation of an impact torque. When the pressure of the working fluid in the high-pressure chamber H elevates along with the progress of the tightening operation, the working fluid path 15*b* is decreased (narrowed) along with elevation of pressure of the working fluid in this high-pressure chamber H.

The action of the impact torque adjusting device of the hydraulic torque wrench of this reference example is the same as that of the impact torque adjusting device of the hydraulic torque wrench of the first and second reference examples, but the two valve bodies 15*d* are disposed oppositely to each other across the working fluid path 15*b*. Depending on the elevation of the pressure of the working fluid in the high-pressure chamber H, the two valve bodies 15*d* are moved to decrease (narrow) the working fluid path 15*b*, so that the moving stroke of the valve bodies 15*d* when moving for adjusting the size of the working fluid path 15*b* can be decreased, and the response performance is enhanced, and the precision of magnitude of the impact torque can be further enhanced.

PATENT LITERATURE

Patent literature 1—Japanese Utility Model Application Laid-Open No. 3-40076

Patent literature 2—Japanese Patent Application Laid-Open No. 6-297349

Patent literature 3—Japanese Patent Application Laid-Open No. 2009-83090

SUMMARY OF THE INVENTION

Problems to be Solved by the Invention

The impact torque adjusting device of the hydraulic torque wrench of the foregoing first to third reference examples had excellent action and effects as described above, but in the case of rotation in one direction, specifically, the function is active in normal rotation only (when tightening), and in the case of rotation in other direction, specifically, the function is not active in reverse rotation only (when loosening), and the above action and effects are not obtained.

It is hence a primary object of the invention to present an impact torque adjusting device of a hydraulic torque wrench capable of enhancing the precision of the magnitude of the impact torque generated by the impact torque generating device of the hydraulic torque wrench during rotation in two directions, that is, in normal rotation (when tightening) and in reverse rotation (when loosening), shortening the generation period of impact toques, and enhancing the durability of the impact torque generating device of the hydraulic torque wrench.

Means for Solving the Problems

To achieve the object, the impact torque adjusting device of hydraulic torque wrench of the present invention is an impact toque adjusting device of a hydraulic torque wrench including a liner which is rotated by a rotor, a main shaft disposed inside of the liner, and blades. A working fluid path is formed to communicate in the inside of the liner working as a high-pressure chamber and a low-pressure chamber at the time of generation of an impact torque. A valve body is disposed in the working fluid path, being biased in a direction of releasing the working fluid path. A rear back side of the valve body is provided with an oil chamber communicating with a blade insertion part of the main shaft by way of a fluid path formed in a liner lid, and the working fluid path is narrowed depending on an elevation of the pressure of the working fluid in the blade insertion part of the main shaft elevating along with an elevation of the pressure of the working fluid in the high-pressure chamber.

In this case, the valve body may be assembled into an output adjusting mechanism for adjusting the magnitude of the impact torque.

Alternatively, two valve bodies are disposed oppositely to each other across the working fluid path, and the rear back side of each valve body is provided with an oil chamber for communicating with a blade insertion part of the main shaft by way of a fluid path formed in a liner upper lid and a lower lid. The two valve bodies move so as to narrow the working fluid path, depending on an elevation of the pressure of the working fluid in the blade insertion part of the main shaft elevating along with an elevation of the pressure of the working fluid in the high-pressure chamber.

Effects of the Invention

According to the impact torque generating device of the hydraulic torque wrench of the present invention, when rotating in both directions, that is, in normal rotation (when tightening) and in reverse rotation (when loosening), it is capable of enhancing the precision of the magnitude of the impact torque generated by the impact torque generating device of the hydraulic torque wrench, shortening the generation period of impact torques, and enhancing the durability of the impact torque generating device of the hydraulic torque wrench.

Still more, by assembling the valve body in the output adjusting mechanism for adjusting the magnitude of the impact torque, the construction of the impact torque adjusting mechanism can be simplified.

Moreover, by disposing two valve bodies oppositely to each other across the working fluid path, and providing the rear back side of each valve body with an oil chamber for communicating with a blade insertion part of the main shaft by way of a fluid path formed in a liner upper lid and a lower lid, and moving the two valve bodies so as to narrow the working fluid path, depending on an elevation of the pressure of the working fluid in the blade insertion part of the main shaft elevating along with an elevation of the pressure of the working fluid in the high-pressure chamber, it is capable of shortening the moving stroke of the valve body when moving for adjusting the size of the working fluid path. Hence the response performance can be enhanced, and the precision of the magnitude of the impact torque may be further enhanced.

BEST MODE FOR CARRYING OUT THE INVENTION

Preferred embodiments of the impact torque adjusting device of the hydraulic torque wrench of the present invention are described below while referring to the accompanying drawings.

Figure 1:
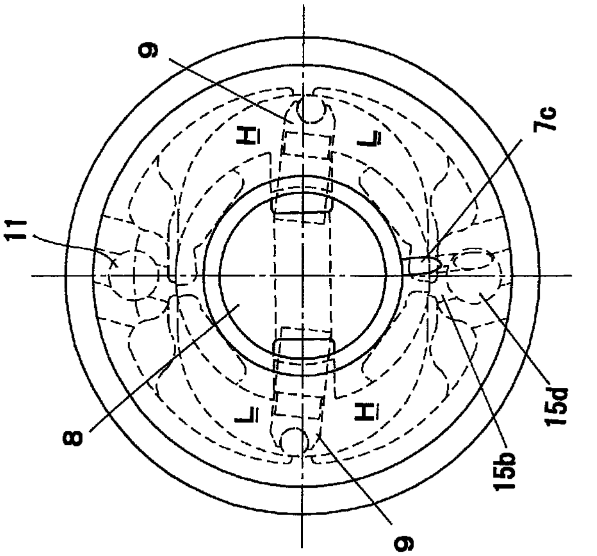
FIGS. 1 (*a*) and (*b*) are explanatory diagrams of essential parts showing an embodiment of an impact torque adjusting device of a hydraulic torque wrench of the present invention, in which FIG. 1 (*a*) is a front sectional view, and FIG. 1 (*b*) is a sectional view along line A-A.
Figure 1:
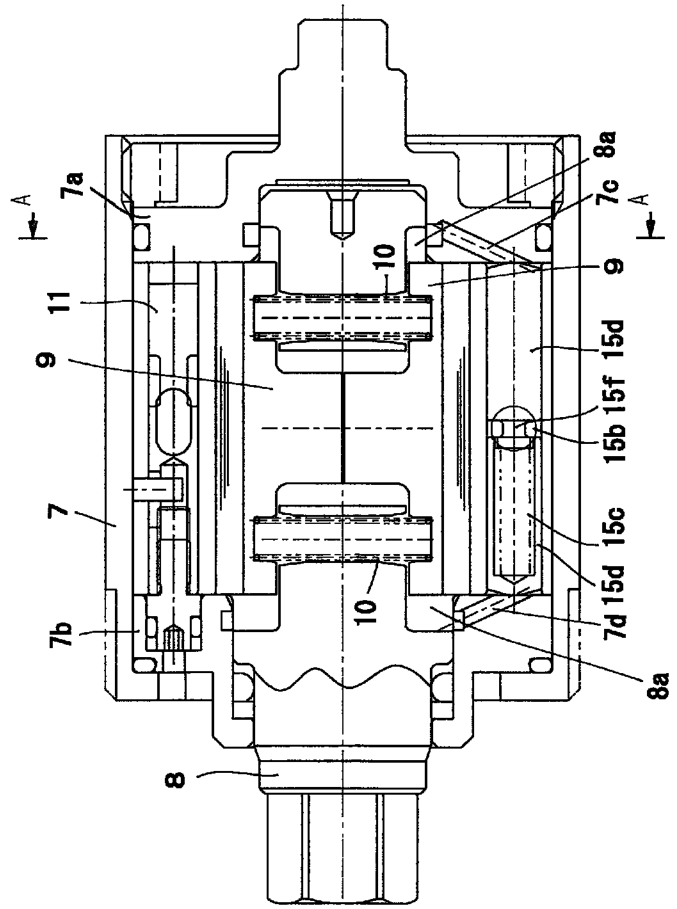
Figure 2:
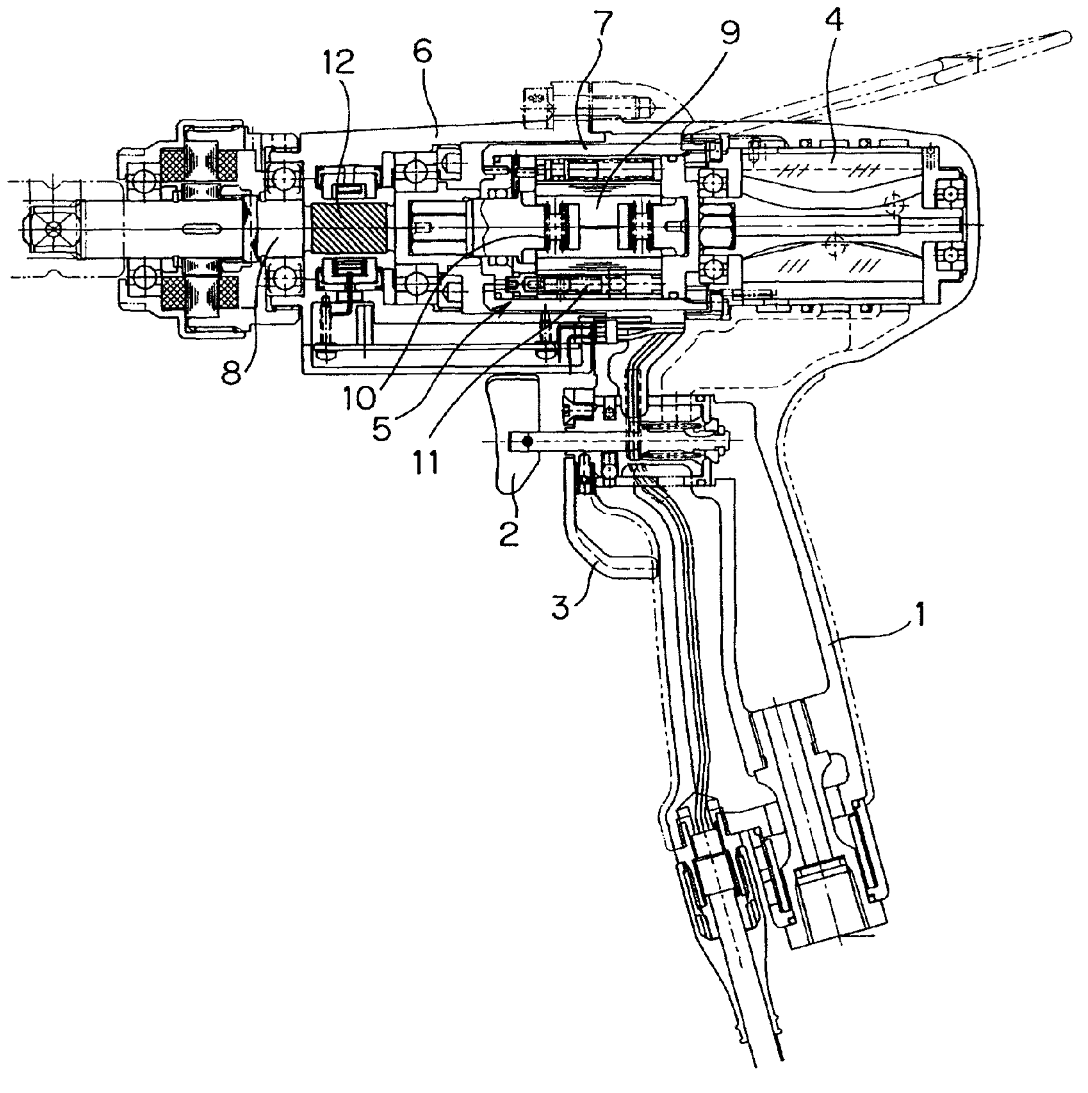
FIG. 2 is a general front sectional view showing a first reference example of an impact torque adjusting device of the hydraulic torque wrench.

FIG. 1 shows an embodiment of the impact torque adjusting device of the hydraulic torque wrench of the present invention (an outline view is omitted).

Figure 8:
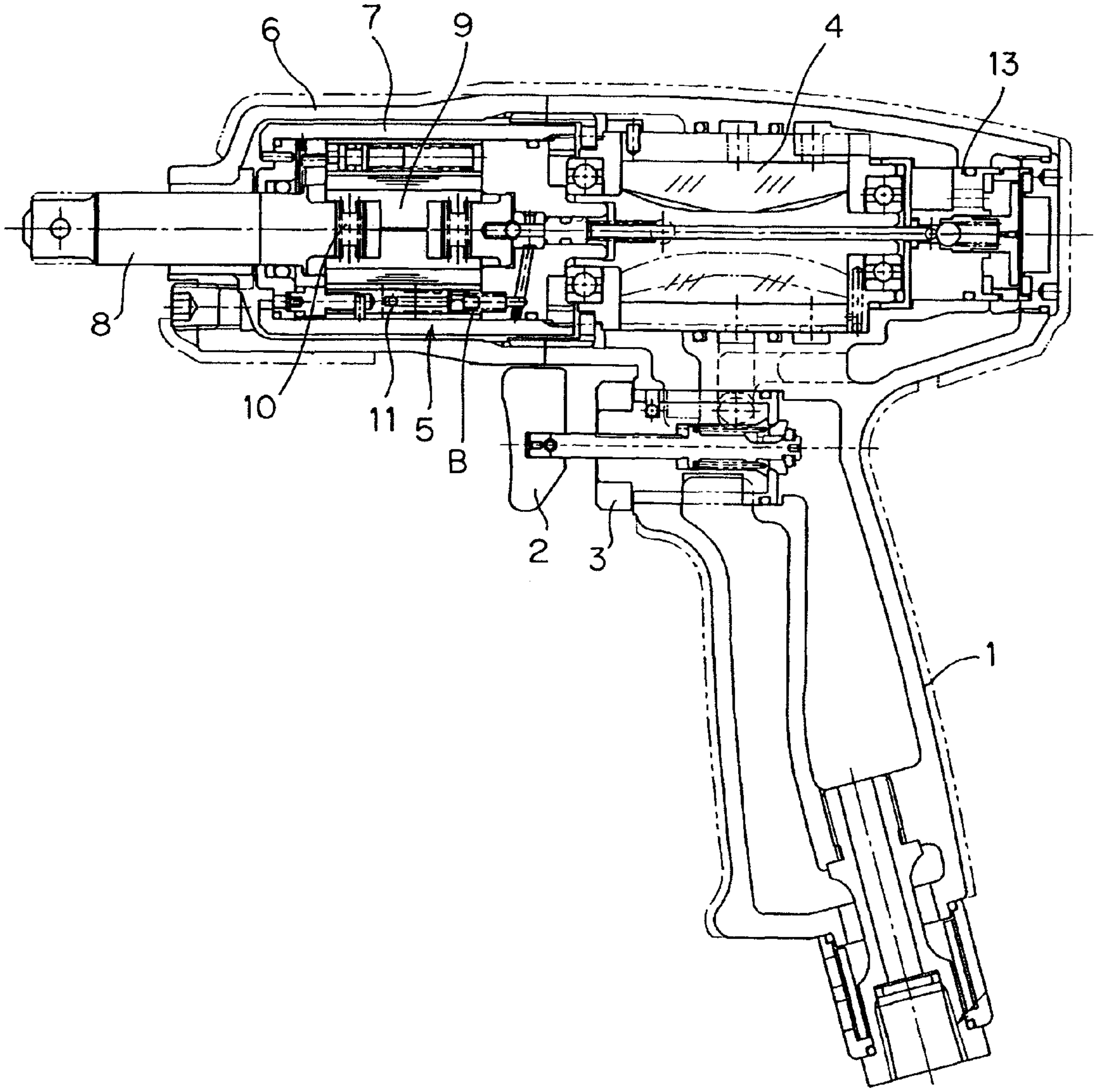
FIG. 8 is a general front sectional view showing a conventional impact torque adjusting device of a hydraulic torque wrench.

A hydraulic torque wrench 1 of the embodiment is designed to control driving of a rotor 4 and others, in a manner not similar to the first reference example in which it is controlled by the output of a torque detection mechanism such as a magnetorestrictive torque detection mechanism 12 or the like, but similar to the second and third reference examples, and the conventional hydraulic torque wrench disclosed in patent literature 1 and FIG. 8, in which a relief valve B is disposed in an output adjusting mechanism 11. When the pressure (impact torque) of working fluid in a high-pressure chamber H reaches a predetermined magnitude as a result of the progress of a tightening operation, the relief valve B is released, and the pressure of the working fluid is transmitted to a shut-off valve mechanism 13. In the case of the hydraulic torque wrench 1 of this type, since a valve body 11*d* cannot be assembled in the output adjusting mechanism 11, a valve body 15*d* is disposed in a liner 7, aside from the output adjusting mechanism 11.

In the case of the hydraulic torque wrench 1 of this type, since a valve body cannot be assembled in the output adjusting mechanism 11, a valve body 15*d* is disposed in a liner 7, aside from the output adjusting mechanism 11.

The valve body 15*d* is composed of two valve bodies 15*d* disposed oppositely to each other across a working fluid path 15*b*, and biased in a direction of releasing the working fluid path 15*b* by way of a spring 15*c*.

In this embodiment, in order that the two valve bodies 15*d* may operate stably, one valve body 15*d* (the right-side valve body 15*d* in FIG. 1 (*a*)) is solid, and the other valve body 15*d* (the left-side valve body 15*d* in FIG. 1 (*a*)) is formed in a tubular shape with a bottom, and a spring holder-guide 15*f* inserted into the tubular part of the valve body 15*d* of the left side, formed in a tubular shape with a bottom, penetrates through the solid valve body 15*d* at the right side.

As a result, the operation stability of the both valve bodies 15*d* is enhanced.

The operation principle of the valve body 15*d* of the impact torque adjusting device of the hydraulic torque wrench of the embodiment is similar to the first to third reference examples, in particular the impact torque adjusting device of the hydraulic torque wrench of the third reference example, but there is a difference in the supplying method of working fluid into the oil chamber 15*e* formed in the rear back part of each valve body 15*d*.

In other words, the two valve bodies 15*d* are disposed oppositely to each other across the working fluid path 11*b*, and at the rear back side of each valve body 15*d*, the oil chamber 15*e* is formed to communicate with the blade insertion part 8*a* of the main shaft 8 by way of the oil paths 7*c*, 7*d* formed the liner upper lid 7*a* and lower lid 7*b*. The two valve bodies 15*d* are moved to decrease (narrow) the working fluid path 11*b*, depending on an elevation of the pressure of the working fluid in the blade insertion part 8*a* of the main shaft 8 elevating along with an elevation of the pressure of the working fluid in the high-pressure chamber H.

The action of the impact torque adjusting device of the hydraulic torque wrench of the embodiment is similar to that of the impact torque adjusting device of the hydraulic torque wrench of the first to second reference examples. In particular, by disposing the two valve bodies 15*d* oppositely to each other across the working fluid path 15*b*, and moving the two valve bodies 15*d* to decrease (narrow) the working fluid path 15*b*, depending on an elevation of the pressure of the working fluid in the blade insertion part 8*a* of the main shaft 8 elevating along with an elevation of the pressure of the working fluid in the high-pressure chamber H, it is possible to reduce the moving stroke of the valve bodies 15*d* when moving for adjusting the size of the working fluid path 15. The response performance is enhanced, and the precision of the magnitude of the impact torque can be further enhanced. But since the blade insertion part 8*a* of the main shaft 8 communicates always with the high-pressure chamber H side within the inside of the liner 7 serving as the high-pressure chamber H and the low-pressure chamber L, when rotating in two directions, that is, in normal rotation (when tightening) and in reverse rotation (when loosening), it is capable of enhancing the precision of the magnitude of the impact torque generated by the impact torque generating device of the hydraulic torque wrench, shortening the generation period of impact toques, and enhancing the durability of the impact torque generating device of the hydraulic torque wrench.

Figure 3:
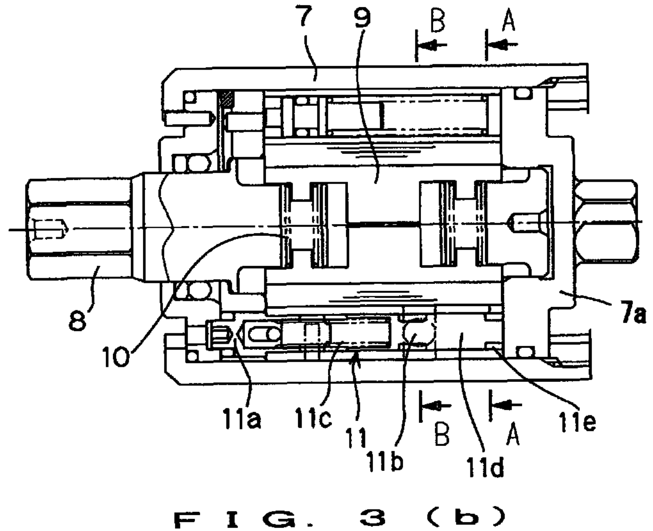
FIGS. 3 (*a*)-(*d*) show the same reference example, in which FIG. 3 (*a*) is an essential front sectional view upon start of a tightening operation, FIG. 3 (*b*) is an essential front sectional view during progress of the tightening operation, FIG. 3 (*c*) is a sectional view along line A-A, and FIG. 3 (*d*) is a sectional view along line B-B.
Figure 3:
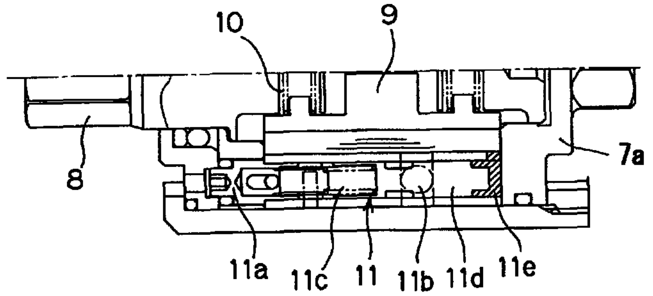
Figure 3:
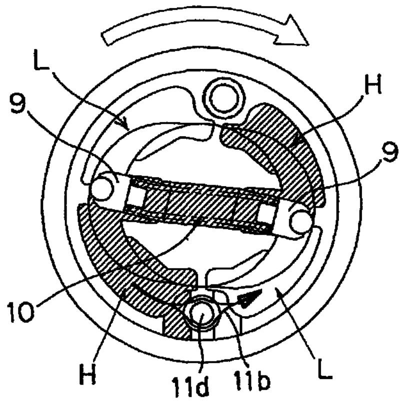
Figure 3:
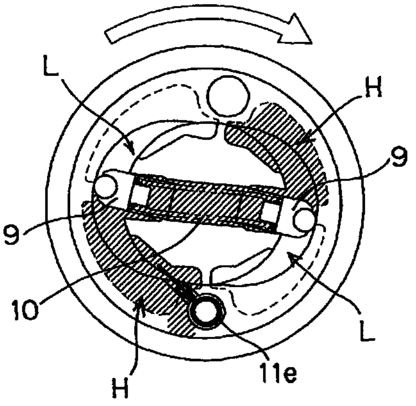
Figure 4:
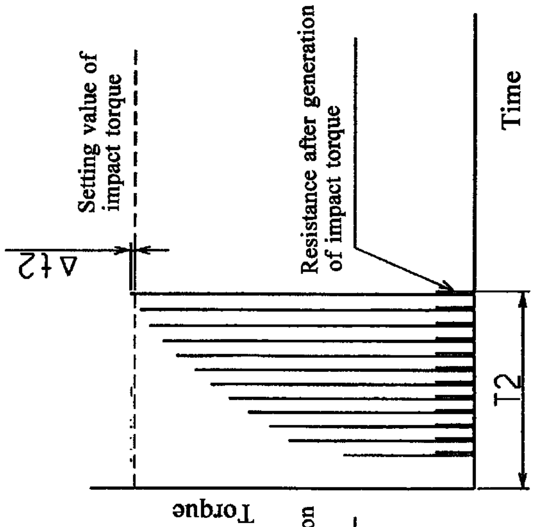
FIGS. 4 (*a*) and (*b*) show output characteristic diagrams, in which FIG. 4 (*a*) shows prior art (the size of the working fluid path is constant (fixed) during operation of the hydraulic torque wrench), and FIG. 4 (*b*) shows the first reference example, respectively.
Figure 4:
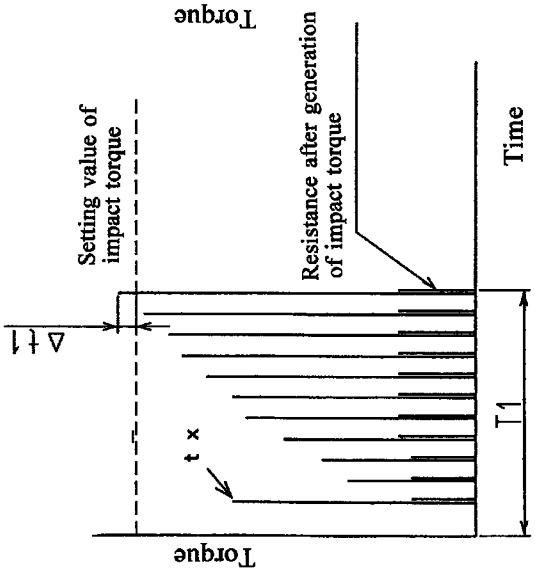
Figure 5:
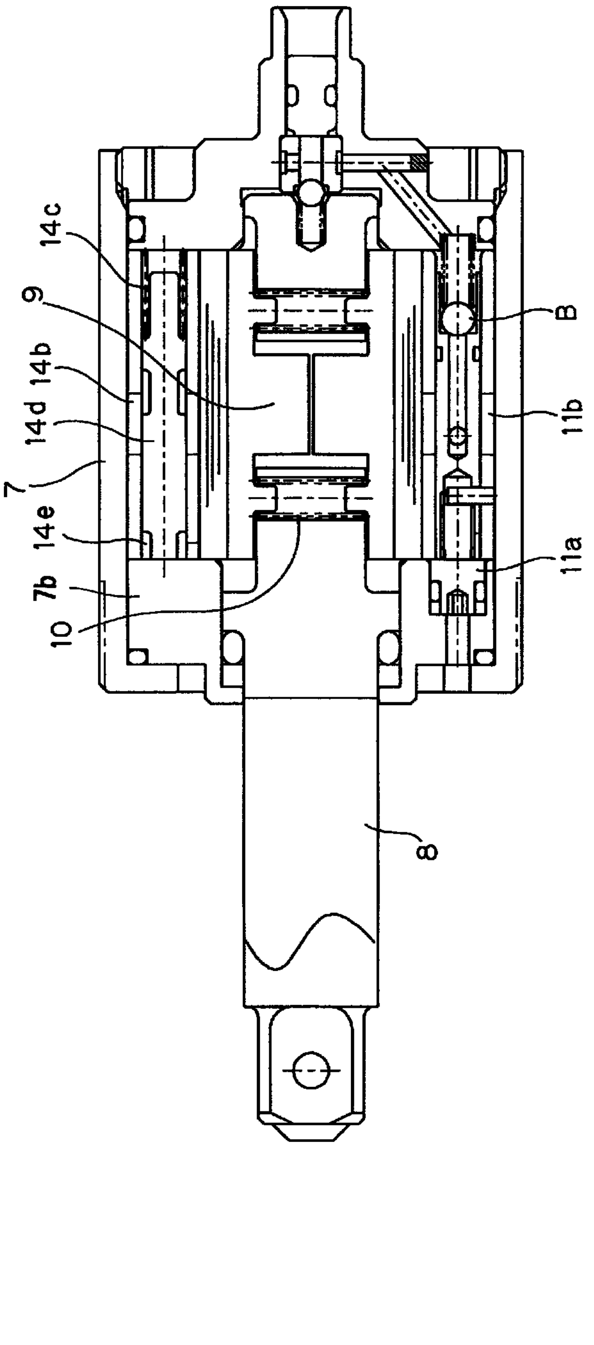
FIG. 5 is an essential front sectional view showing a second reference example of the impact torque adjusting device of the hydraulic torque wrench.
Figure 6:
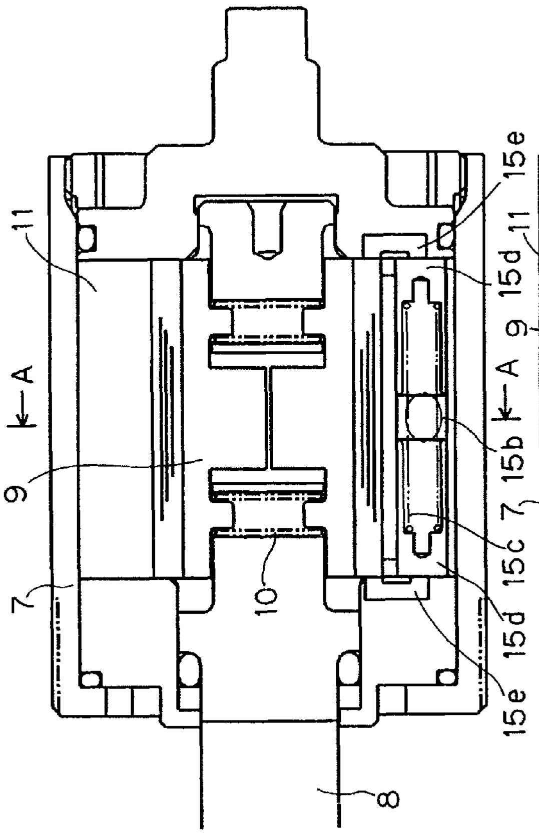
FIGS. 6 (*a*)-(*c*) show a third reference example of the impact torque adjusting device of the hydraulic torque wrench, in which FIG. 6 (*a*) is an essential front sectional view upon start of tightening operation, FIG. 6 (*b*) is an essential front sectional view during progress of tightening operation, and FIG. 6 (*c*) is a sectional view along line A-A.
Figure 6:
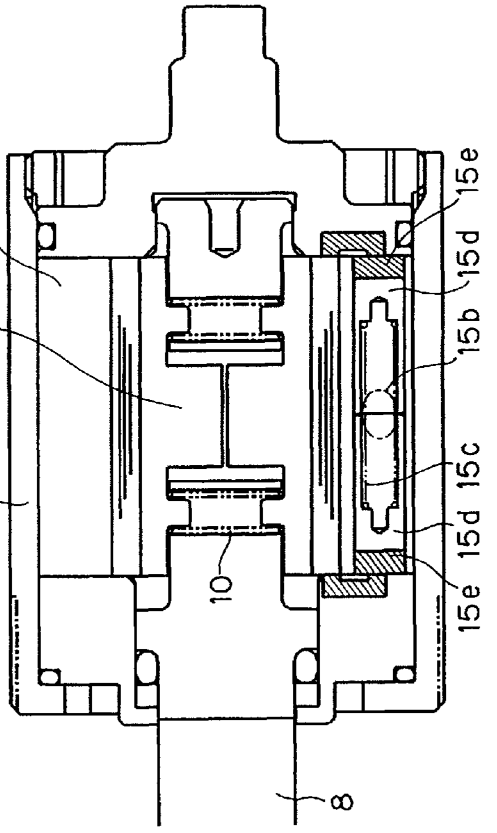
Figure 6:
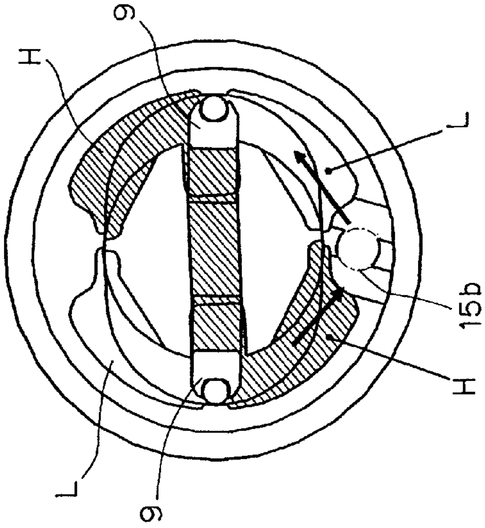
Figure 7:
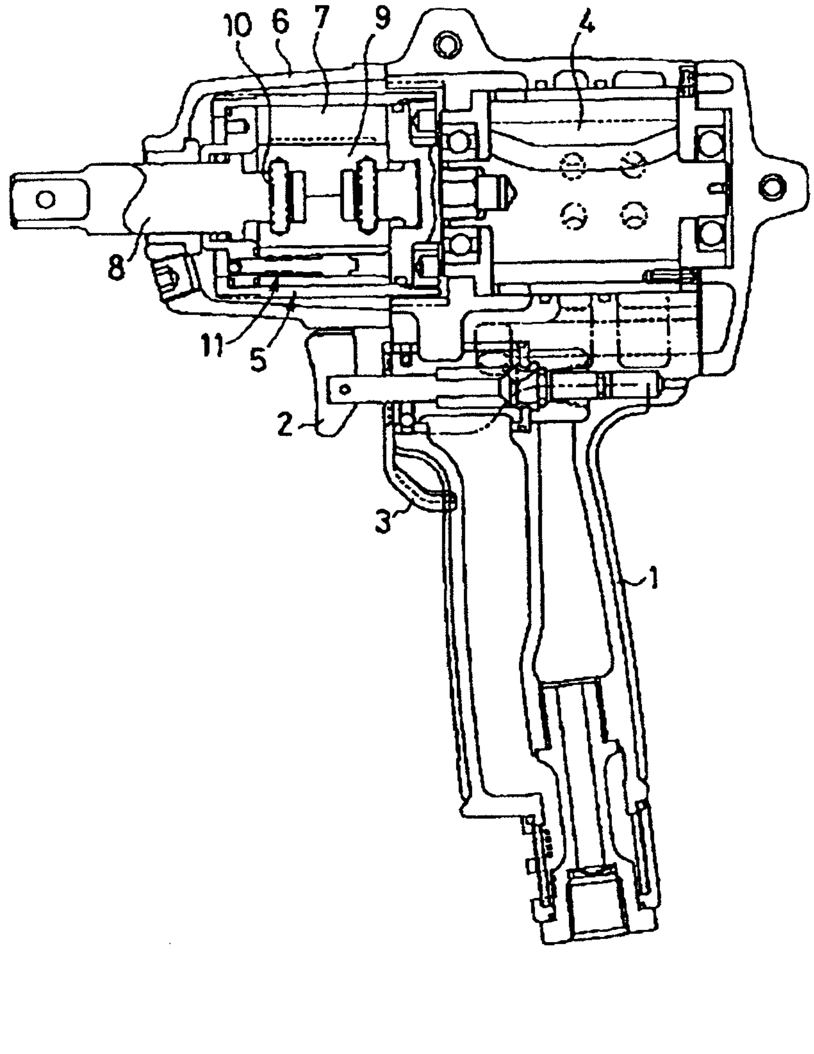
FIG. 7 is a general front sectional view showing a conventional impact torque adjusting device of a hydraulic torque wrench.

The impact torque adjusting device of the hydraulic torque wrench of the present invention is described herein by reference to the embodiment, but the present invention is not limited to the configuration of the illustrated embodiment alone. Various changes and modifications are possible within a scope not departing from the true spirit of the present invention, for example, in relation to the impact torque adjusting device of the hydraulic torque wrench of the first reference example, as shown in FIG. 3, the path communicating between the blade insertion part of the main shaft 8 and the oil chamber 11*e* may be formed in the liner upper lid 7*a*, or in relation to the impact torque adjusting device of the hydraulic torque wrench of the second reference example, as shown in FIG. 5, the path communicating between the blade insertion part of the main shaft 8 and the oil chamber 14*e* may be formed in the liner lower lid 7*b*. The positions of disposing the output adjusting mechanism 11, and the valve bodies 11*d*, 14*d*, and 15*d* may be changed from the tubular parts of the liner 7 to the lid parts.

INDUSTRIAL APPLICABILITY

The impact torque adjusting device of the hydraulic torque wrench of the present invention is capable of enhancing the precision of the magnitude of the impact torque generated by the impact torque generating device of the hydraulic torque wrench, shortening the generation period of impact toques, and enhancing the durability of the impact torque generating device of the hydraulic torque wrench, when rotating in two directions, that is, in normal rotation (when tightening) and in reverse rotation (when loosening), and is hence preferably used in an application of a hydraulic torque wrench making use of the impact torque adjusting device of the hydraulic torque wrench.

DESCRIPTION OF THE REFERENCE NUMERALS

1 Hydraulic torque wrench
2 Main valve
3 Normal and reverse rotation changeover valve
4 Rotor
5 Impact torque generating device
6 Case
7 Liner
7*a* Liner upper lid
7*b* Liner lower lid
7*c* Fluid path
7*d* Fluid path
8 Main shaft
8*a* Blade insertion part
9 Blade
10 Spring
11 Output adjusting mechanism
11*a* Operation shaft
11*b* Working fluid path
11*c* Spring
11*d* Valve body
11*e* Oil chamber
12 Magnetorestrictive torque detection mechanism
13 Shut-off valve mechanism
14*b* Working fluid path

14*c* Spring
14*d* Valve body
14*e* Oil chamber
15*b* Working fluid chamber
15*c* Spring
15*d* Valve body
15*e* Oil chamber
15*f* Spring holder-guide
B Relief valve
H High-pressure chamber
L Low-pressure chamber

The invention claimed is:

1. An impact torque-adjusting device in a hydraulic torque wrench, comprising:

a liner having a liner lid and a fluid path formed in said liner lid;

a rotor for rotating said liner;

a main shaft disposed inside of said liner, said main shaft having a blade insertion part and said main shaft housing having two directions of rotation;

blades provided in said blade insertion part inside of said liner, wherein the inside of said liner comprises a high-pressure chamber and a low-pressure chamber in operation, and wherein said high-pressure chamber communicates with said blade insertion part;

a working fluid path that communicates with the inside of said liner;

a valve body disposed in said working fluid path and biased in a direction of opening said working fluid path, said valve body having a rear back side; and an oil chamber on said rear back side of said valve body, said oil chamber communicating with said blade insertion part of said main shaft through said fluid path formed in said liner lid;

wherein said valve body is arranged such that said working fluid path is narrowed in response to an elevation of the pressure of the working fluid in said blade insertion part of said main shaft along with an elevation of the pressure of the working fluid in said high-pressure chamber in both of the two directions of rotation of said main shaft.

2. The impact torque adjusting device in a hydraulic torque wrench of claim 1, wherein said valve body is assembled into an output adjusting mechanism that adjusts the magnitude of the impact torque.

3. The impact torque adjusting device in a hydraulic torque wrench of claim 1, wherein a second valve body is disposed in said working fluid path so that said valve body and said second valve body are disposed opposite to each other across said working fluid path, a second oil chamber is provided on a rear back side of said second valve body, said second oil chamber communicates with said blade insertion part of said main shaft by way of a second fluid path, wherein said fluid path in said liner lid and said second fluid path are each formed in a respective on of a liner upper lid and a liner lower lid, and said valve body and said second valve body are arranged so as to narrow said working fluid path in dependence on an elevation of the pressure of the working fluid in said blade insertion part of said main shaft along with an elevation of the pressure of the working fluid in said high pressure chamber.

4. The impact torque adjusting device in a hydraulic torque wrench of claim 2, wherein a second valve body is disposed in said working fluid path so that said valve body and said second valve body are disposed opposite to each other across said working fluid path, a second oil chamber is provided on a rear back side of said second valve body, said second oil chamber communicates with said blade insertion part of said main shaft by way of a second fluid path, wherein said fluid path in said liner lid and said second fluid path are each formed in a respective on of a liner upper lid and a liner lower lid, and said valve body and said second valve body are arranged so as to narrow said working fluid path in dependence on an elevation of the pressure of the working fluid in said blade insertion part of said main shaft along with an elevation of the pressure of the working fluid in said high pressure chamber.

* * * * *